(12) United States Patent
Song et al.

(10) Patent No.: US 7,099,655 B2
(45) Date of Patent: Aug. 29, 2006

(54) METHOD FOR PROVIDING BROADCAST SERVICE IN A CDMA MOBILE COMMUNICATION SYSTEM

(75) Inventors: Jun-Hyuk Song, Anyang-shi (KR); Yong Chang, Songnam-shi (KR); Nae-Hyun Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 170 days.

(21) Appl. No.: 10/435,593

(22) Filed: May 12, 2003

(65) Prior Publication Data

US 2003/0211843 A1 Nov. 13, 2003

(30) Foreign Application Priority Data

May 13, 2002 (KR) ........................ 10-2002-0026290

(51) Int. Cl.
  *H04M 1/66* (2006.01)
  *H04M 1/68* (2006.01)
  *H04M 3/16* (2006.01)

(52) U.S. Cl. ...................... 455/411; 455/410; 455/406; 455/414.3; 455/414.1; 455/435.1

(58) Field of Classification Search ................ 455/411, 455/410, 406, 414.1, 414.2, 414.3, 3.01, 455/435.1, 433, 450
See application file for complete search history.

(56) References Cited

U.S. PATENT DOCUMENTS

| 5,787,083 | A * | 7/1998 | Iwamoto et al. ............. 370/389 |
| 6,795,705 | B1 * | 9/2004 | Warrier et al. ............ 455/435.1 |
| 2002/0046277 | A1 | 4/2002 | Barna et al. ................. 709/224 |
| 2002/0057662 | A1 * | 5/2002 | Lim ............................ 370/338 |
| 2002/0068570 | A1 * | 6/2002 | Abrol et al. ................. 455/438 |
| 2002/0145990 | A1 * | 10/2002 | Sayeedi ....................... 370/335 |
| 2002/0154610 | A1 * | 10/2002 | Tiedemann et al. ......... 370/329 |
| 2002/0196749 | A1 * | 12/2002 | Eyuboglu et al. ........... 370/328 |
| 2003/0039361 | A1 * | 2/2003 | Hawkes et al. ............. 380/278 |
| 2003/0073453 | A1 * | 4/2003 | Basilier ....................... 455/503 |
| 2003/0134622 | A1 * | 7/2003 | Hsu et al. ................... 455/414 |
| 2004/0120527 | A1 * | 6/2004 | Hawkes et al. ............. 380/277 |
| 2004/0198371 | A1 * | 10/2004 | Balasubramanian et al. ..... 455/452.2 |

FOREIGN PATENT DOCUMENTS

| KR | 0011040 | 9/2002 |
| KR | 0061415 | 4/2003 |

(Continued)

*Primary Examiner*—George Eng
*Assistant Examiner*—Huy Phan
(74) *Attorney, Agent, or Firm*—Roylance, Abrams, Berdo & Goodman, L.L.P.

(57) ABSTRACT

Disclosed is a method for providing a broadcast service in a mobile communication system using code division multiple access (CDMA) technology. The novel method controls transmission of broadcast service data according to base station areas by registering a mobile station with a broadcast service. For that purpose, the mobile station requests an authentication server to authenticate a desired broadcast service, and registers the authenticated broadcast service in a packet data serving node via a base station so that the base station and the packet data serving node can set up a transmission path for the broadcast service. The method increases the efficiency of base station resources by controlling transmission times of base stations, and the packet data serving node can perform accounting on the broadcast service of the mobile station. Further, a plurality of registered mobile stations constitute a group, and broadcast service data is transmitted from one mobile station to other mobile stations within the group.

17 Claims, 12 Drawing Sheets

| FOREIGN PATENT DOCUMENTS | | | WO | 0165885 | 9/2001 |
|---|---|---|---|---|---|
| KR | 0076576 | 6/2003 | | | |
| KR | 0077655 | 6/2003 | * cited by examiner | | |

METHOD FOR PROVIDING BROADCAST SERVICE IN A CDMA MOBILE COMMUNICATION SYSTEM

PRIORITY

This application claims priority under 35 U.S.C. § 119 to an application entitled "Method for Providing Broadcast Service in a CDMA Mobile Communication System" filed in the Korean Intellectual Property Office on May 13, 2002 and assigned Serial No. 2002-26290, the contents of which are incorporated herein by reference.

BACKGROUND OF THE INVENTION

1. Field of the Invention

The present invention relates generally to broadcast services, and in particular, to a method for more efficiently providing broadcast services in a mobile communication system using code division multiple access (hereinafter referred to as "CDMA") technology.

2. Description of the Related Art

In the future, communications environments will undergo rapid changes regardless of wired/wireless region or country. In particular, the communications environment, such as IMT-2000 (International Mobile Telecommunication-2000), tends to synthetically provide users with various information needs including image and voice information on a real-time basis. With the development of mobile communication technology, even in a cellular wireless communication system or PCS (Personal Communications System) mobile communication system, a mobile station (MS) has the ability to not only simply perform voice communication but also to transmit text information and to receive broadcast services.

At present, 3GPP2 ($3^{rd}$ Generation Partnership Project 2) considers the efficient utilization of various service media and resources for a broadcast service in a mobile communication system. Such a broadcast service is performed by unidirectionally transmitting high-speed forward data without receiving reverse feedback information from a mobile station. A broadcast service in a mobile communication system is characterized in that a plurality of base stations (BSs) simultaneously transmit the same data stream. This is conceptually similar to a general television broadcasting service.

If a common channel is designed so as to guarantee the same performance even at a cell boundary, cell capacity is excessively wasted. Therefore, in a $3^{rd}$ generation mobile communication system, a structure of a supplemental channel proposed as a dedicated channel for a packet data service is partially modified to realize high-speed transmission for a broadcast service. The supplemental channel uses a common long code mask instead of a long code mask dedicated to a user, for a broadcast service. During a broadcast service, autonomous handoff not requiring feedback information from a mobile station and outer coding are performed to guarantee performance higher than or equal to that of an existing common channel.

In an existing wireless broadcast service under discussion, a broadcast service provider is limited to a specific broadcast server or a contents server designated by a common carrier, so mobile stations can only passively receive the broadcast service. Therefore, the service provider cannot charge for the broadcast service according to its service time or quantity. In addition, because the same data stream is simultaneously transmitted from several base stations as stated above, network resources for a broadcast service must be assigned to all the base stations, preventing efficient utilization of resources.

SUMMARY OF THE INVENTION

It is, therefore, an object of the present invention to provide a broadcast service method for simultaneously transmitting and receiving voice, text and image data between mobile stations in a mobile communication system.

It is another object of the present invention to provide a broadcast service method for forming a group of mobile stations in a network, and simultaneously transmitting and receiving voice, text or image data between the mobile stations in the group.

It is further another object of the present invention to provide a broadcast service method capable of efficiently using wired/wireless resources of a base station and a network.

It is still another object of the present invention to provide a broadcast service method capable of controlling a transmission time of a base station and assignment of network resources.

According to one aspect of the present invention, there is provided a method for receiving a broadcast service by a mobile station in a wireless broadcast service system including the mobile station existing in a service area, a base station capable of connecting a wireless channel, a packet data serving node for connecting the base station to a packet communication network, a broadcast server connected to the packet communication network, and an authentication server connected to the packet communication network. The method comprises the steps of: performing user authentication by setting up a connection with the authentication server, and receiving, if the user authentication is passed, information on available broadcast services from the broadcasting server; registering a desired broadcast service in the packet data serving node based on the received information so that the packet data serving node assigns a network resource for the desired broadcast service; if the desired broadcast service is authorized by the packet data serving node, registering the desired broadcast service in the base station so that the base station assigns a wireless broadcast supplemental channel and a network resource for the desired broadcast service; and receiving broadcast data for the desired broadcast service over the broadcast supplemental channel assigned to the base station.

According to another aspect of the present invention, there is provided a method for providing a broadcast service to a mobile station by a base station in a wireless broadcast service system including the mobile station existing in a service area, the base station capable of connecting a wireless channel, a packet data serving node for connecting the base station to a packet communication network, a broadcast server connected to the packet communication network, and an authentication server connected to the packet communication network. The method comprises the steps of: upon receiving a broadcast service registration request from the mobile station, determining whether the requested broadcast service is already being provided; if the requested broadcast service is not being provided, registering the requested broadcast service in the packet data serving node so that the packet data serving node assigns a network resource for the requested broadcast service; and if the requested broadcast service is authorized by the packet data serving node, assigning a wireless broadcast supplemental channel for the broadcast service and transmitting broadcast data for the requested broadcast service received from the packet data serving node to the mobile station over the assigned broadcast supplemental channel.

According to another aspect of the present invention, there is provided a method for providing a broadcast service to a mobile station by a packet data serving node in a wireless broadcast service system including the mobile station existing in a service area, a base station capable of connecting a wireless channel, the packet data serving node for connecting the base station to a packet communication network, a broadcast server connected to the packet communication network, and an authentication server connected to the packet data communication network. The method comprising the steps of: receiving information on broadcast services available for the mobile station from the authentication server; upon receiving a registration request for a broadcast service desired by the mobile station, assigning a network resource for the requested broadcast service based on the received information on the available broadcast services; and upon receiving a registration request for the requested broadcast service from the base station, transmitting broadcast data for the requested broadcast service received from the broadcast server to the mobile station through the base station, using the assigned network resource.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
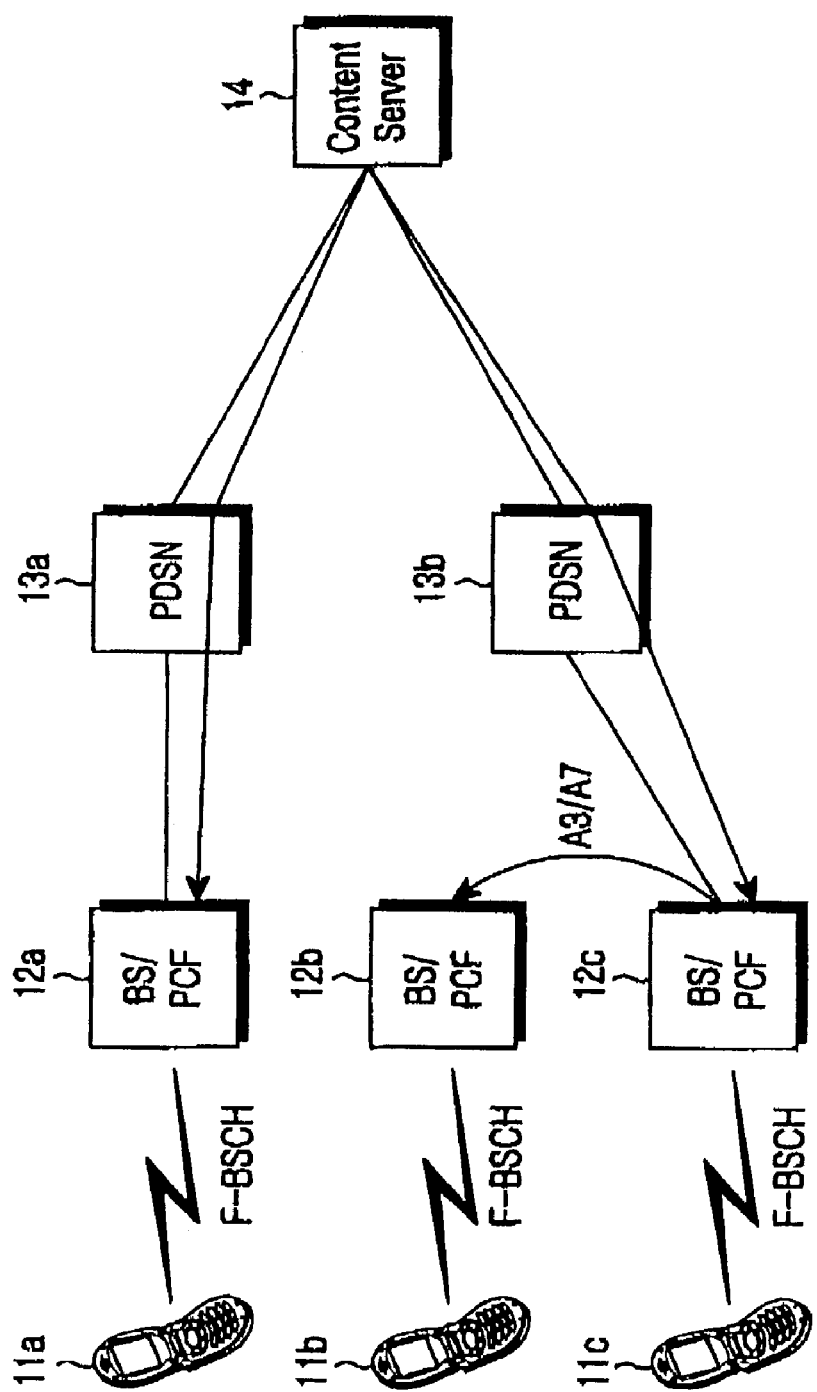
FIG. 1 illustrates the entire configuration of a common broadcast service system.

Several preferred embodiments of the present invention will now be described in detail with reference to the attached drawings. In the drawings, it should be noted that the same or similar elements are denoted by the same reference numerals even though they are depicted in different drawings. In the following description, a detailed description of known functions and configurations incorporated herein has been omitted for conciseness.

The disclosed embodiments of the present invention are characterized in that in a mobile communication system supporting a broadcast service, a broadcast server or a specific mobile station provides a broadcast service to registered mobile stations constituting a logical group. A packet data serving node (PDSN) authenticates mobile stations registered in a broadcast service receiving group, and controls base stations servicing corresponding mobile stations to assign a forward broadcast supplemental channel (hereinafter referred to as "F-BSCH"). Herein, reference will be made to a structure of a mobile communication system and a wireless channel based on 3GPP2 in order to describe an operating principal of the present invention. However, it should be readily understood by those of skill in the art that the present invention is not limited to 3GPP2 implementations.

FIG. 1 illustrates a common broadcast service system. Referring to FIG. 1, a broadcast server or contents server (CS) 14 generates an IP packet by compressing image and/or voice data for a broadcast service, i.e., broadcast data, according to an Internet protocol (IP), and delivers the IP packet to base stations (BS) 12a, 12b and 12c via packet data serving nodes (PDSNs) 13a and 13b over a packet communication network such as the Internet. Each of the base stations 12a, 12b and 12c are comprised of a base transceiver subsystem (BTS), a base station controller (BSC), and a packet control function unit (PCF), and thus, they are represented by BS/PCF.

In order to deliver the broadcast data generated by the broadcast server 14 to the base stations 12a, 12b and 12c, IP multicast technology is used. The base stations 12a, 12b and 12c form a multicast group which is provided with IP multicast data from the broadcast server 14. Membership information of the multicast group is retained by an undepicted multicast router (MR) connected to each of the base stations 12a, 12b and 12c. That is, IP multicast data including the image and/or voice data generated by the broadcast server 14 is broadcasted to the base stations 12a, 12b and 12c forming the multicast group, and the base stations 12a, 12b and 12c convert the IP multicast data into a radio frequency (RF) signal, and then transmit the RF signal in their service areas.

In FIG. 1, however, the base stations 12a, 12b and 12c always transmit the broadcast data regardless of whether a mobile station exists in their service areas. Thus, the base stations 12a, 12b and 12c may unnecessarily waste wired and wireless resources, and mobile stations 11a, 11b and 11c located in the service areas of the base stations 12a, 12b and 12c must passively receive the broadcast data.

Figure 2:
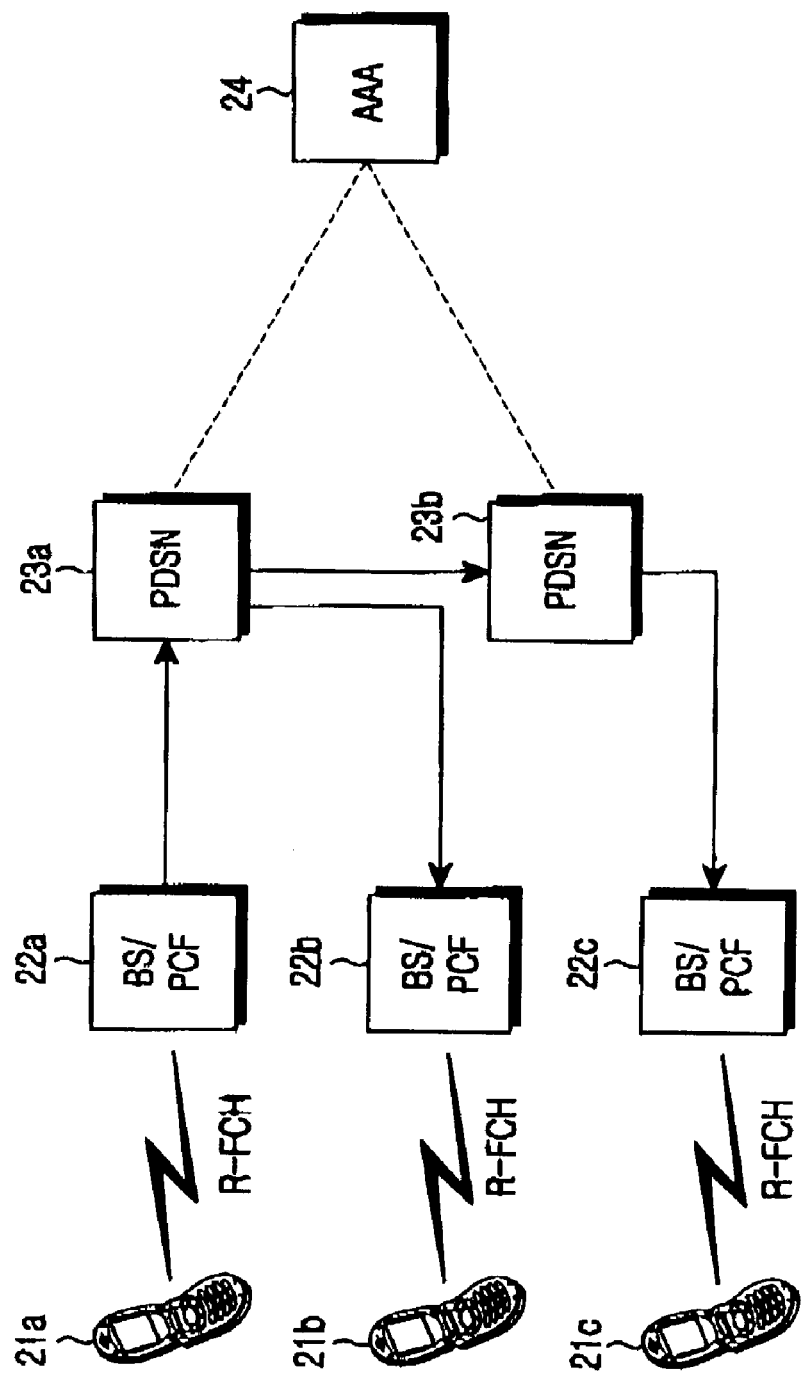
FIG. 2 illustrates the configuration of a broadcast service system in which an authenticated mobile station serves as a source of a broadcast service according to an embodiment of the present invention.

FIG. 2 illustrates the configuration of a broadcast service system in which an authenticated mobile station serves as a source of a broadcast service according to an embodiment of the present invention. Referring to FIG. 2, a mobile station 21a, serving as a broadcast service source authenticated by an authentication server (or an Authentication, Authorization and Accounting (AAA) server) 24, has been registered in a packet data serving node (PDSN) 23a to provide a broadcast service. Broadcast data transmitted over a reverse fundamental channel (hereinafter referred to as "R-FCH") established between the mobile station 21a and its associated base station 22a is provided to base stations 22b and 22c by packet data serving nodes 23a and 23b. The base stations 22b and 22c provide the broadcast data to mobile stations 21b and 21c in their service areas over forward broadcast supplemental channels (F-BSCHs). The broadcast data is transmitted in the form of IP multicast data. The mobile stations 21b and 21c provided with the broadcast data have been registered in the corresponding packet data serving nodes 23a and 23b for broadcast reception, forming a logical group. The authenticated mobile station 21a can transmit broadcast data to the registered mobile stations 21b and 21c.

Figure 3:
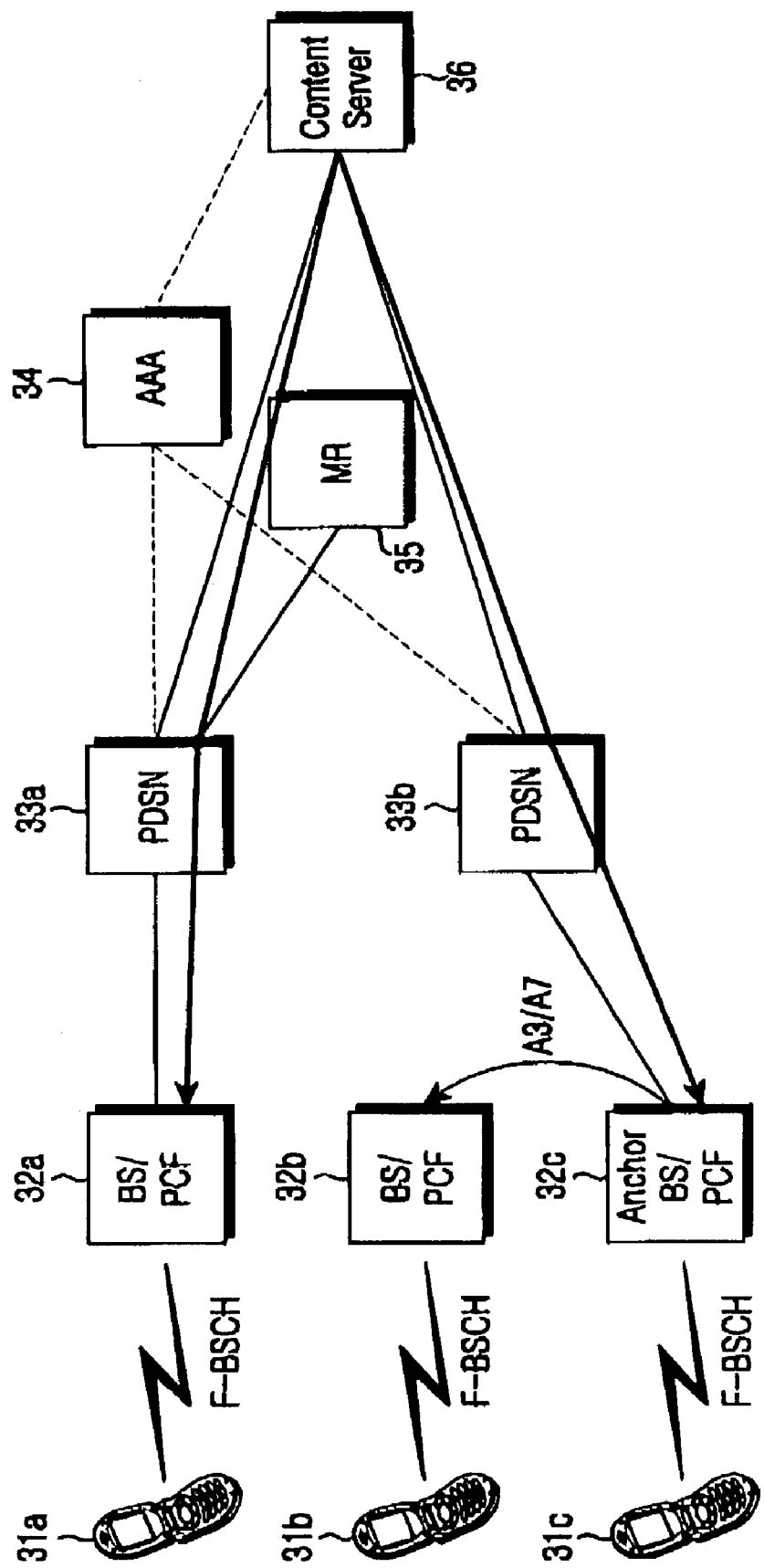
FIG. 3 illustrates configuration of a broadcast service system in which an authenticated broadcast server serves as a source of a broadcast service according to another embodiment of the present invention.

FIG. 3 illustrates configuration of a broadcast service system in which an authenticated broadcast server serves as a source of a broadcast service according to another embodiment of the present invention. Referring to FIG. 3, a broadcast server 36 serves as a broadcast service source authenticated by an authentication server (or an AAA server) 34, and broadcast data transmitted in the form of IP multicast data by the broadcast server 36 is directly delivered to an adjacent packet data serving node 33b and also delivered to a packet data serving node 33a of another network via a multicast router (MR) 35. The packet data serving nodes 33a and 33b transmit the broadcast data to base stations 32a, 32b and 32c that service mobile stations 31a, 31b and 31c registered for a broadcast service. The base stations 32a, 32b and 32c provide the broadcast data to the mobile stations 31a, 31b and 31c over forward broadcast supplemental channels (F-BSCHs). The mobile stations 31a, 31b and 31c provided with the broadcast data have been registered in the corresponding packet data serving nodes 33a and 33b for broadcast reception, forming a logical group. As a result, the authenticated broadcast server 36 can transmit broadcast data to the registered mobile stations 31a, 31b and 31c.

With reference to FIGS. 4 to 12, a description will now be made of an operation of providing a broadcast service in a mobile communication system according to an embodiment of the present invention.

Figure 4:
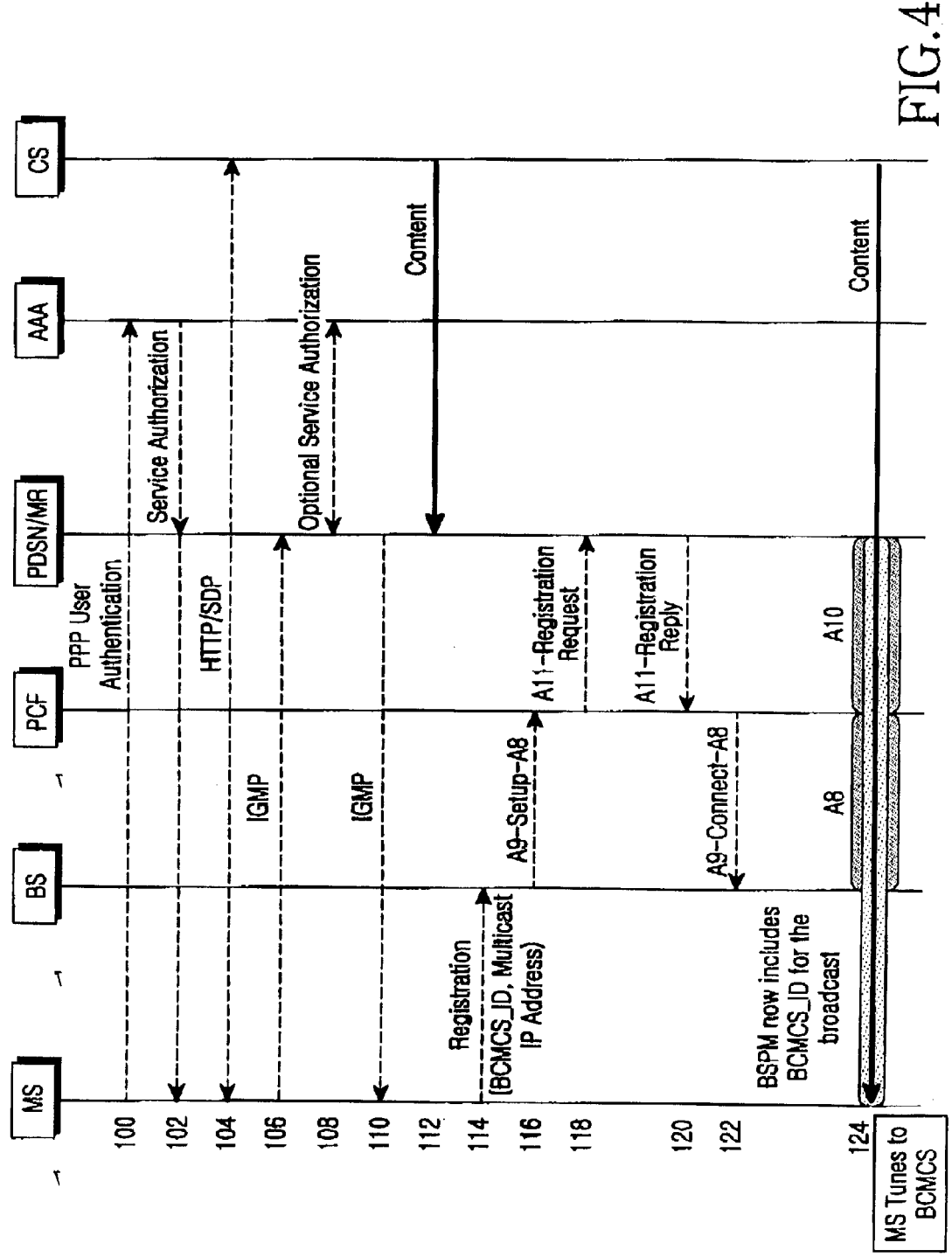
FIG. 4 is a message flow diagram illustrating a procedure for registering a broadcast service desired by a mobile station in a packet data serving node (PDSN) via a base station to thereby assign system and network resources according to an embodiment of the present invention.

FIG. 4 is a message flow diagram illustrating a procedure for registering a broadcast service desired by a mobile station in a packet data serving node (PDSN) via a base station to thereby assign system and network resources according to an embodiment of the present invention. As shown in FIG. 4, a packet data serving node and a base station start providing a broadcast service only at the request of a mobile station, rather than always providing the broadcast service.

Referring to FIG. 4, in step 100, a mobile station (MS) sets up a connection to an authentication server (AAA) according to a point-to-point protocol (hereinafter referred to as "PPP"), and then sends a user authentication request to the authentication server (AAA) through the set connection in order to request a broadcast service. If the authentication is passed, the authentication server delivers information on broadcast services that the mobile station can receive to a corresponding packet data serving node (PDSN) in step 102, the information being stored in its database through a service authorization procedure.

The delivered information includes broadcast multicast service identifiers (hereinafter referred to as "BCMCS_IDs") for identifying broadcast services, multicast IP addresses and source IP addresses for identifying sources that provide a broadcast service, or includes a table identifier by which the above parameters can be searched from a database of the packet data serving node (PDSN).

In step 104, the mobile station connects a call to a broadcast server (or a contents server (CS)) using a hypertext transfer protocol (HTTP) or a session description protocol (SDP), and receives session information related to broadcast services from the broadcast server. This is achieved through a dedicated channel by using a call based on Service Option 33 (hereinafter referred to as "SO33") designating a packet data service. In step 106, the mobile station sends an IGMP (Internet Group Management Protocol) message to the packet data serving node along with a multicast IP address corresponding to a desired broadcast service. The packet data serving node analyzes the requested multicast IP address included in the IGMP message.

In the case where the packet data serving node is already servicing the corresponding broadcast contents while the multicast IP address requested in step 104 by the mobile station is identical to a multicast IP address authorized in step 102 by the authentication server, the packet data serving node does not require new management such as system and network resource assignment for providing a broadcast service. On the other hand, in the case where the requested multicast IP address is identical to the authorized multicast IP address but the packet data serving node is not performing the service, the packet data serving node registers the requested multicast IP address in a multicast IP routing table of its internal database.

If the requested multicast IP address is not identical to the authorized multicast IP address, the packet data serving node inquires of the authentication server about whether the requested multicast IP address is available, through an optional service authentication procedure, in step 108. If it is determined that the requested multicast IP address is available, the packet data serving node registers the requested multicast IP address in the multicast IP routing table, and builds a multicast IP spanning tree by communicating a routing message indicating the particulars registered in the routing table with neighboring routers.

After the requested multicast IP address is analyzed, the packet data serving node transmits an IGMP message to the mobile station in response to the IGMP message in step 110. In step 112, the broadcast server starts transmitting broadcast data for the corresponding broadcast service to the packet data serving node.

At this moment, the mobile station has already received all information necessary for reception of a broadcast service, and in particular session information, BCMCS_ID, and multicast IP address. Therefore, in step 114, the mobile station sends a registration request for the desired broadcast service corresponding to the BCMCS_ID and the multicast IP address to a base station (BS) over an access channel, using the session information. The base station then analyzes the BCMCS_ID and the multicast IP address, registration of which was requested by the mobile station.

If a broadcast service corresponding to the BCMCS_ID and the multicast IP address is not currently being provided by the base station, the base station must newly assign wired and wireless resources for the broadcast service. Thus, in step 116, the base station sends a packet control function unit (PCF) a call setup message (A9-Setup-A8) carrying the BCMCS_ID and the multicast IP address. In step 118, the packet control function unit sends the packet data serving node a registration request message (A11-Registration Request) carrying the BCMCS_ID and the multicast IP address, in response to the call setup message.

In step 120, the packet data serving node transmits to the packet control function unit a registration response message (A11-Registration Reply) indicating that a broadcast service corresponding to the BCMCS_ID and the multicast IP address was authorized, in response to the registration request message. In step 122, the packet control function unit (PCF) determines from the registration response message that the broadcast service was authorized, and then delivers a connection message (A9-Connect-A8) for notifying this situation, to the base station. The base station then assigns wired and wireless resources as well as a forward broadcast supplemental channel (F-BSCH) for the broadcast service, and starts the broadcast service. That is, the base station receives broadcast data from the broadcast server via the packet data serving node, and starts transmitting the received broadcast data over the forward broadcast supplemental channel (F-BSCH).

In step 124, the mobile station receives the broadcast data by tuning to the forward broadcast supplemental channel corresponding to the BCMCS_ID. A plurality of mobile stations desiring to receive the same broadcast service are registered as a broadcast service receiving group, and the broadcast service in the packet data serving node and the base station continues until a predetermined broadcast timer expires or all mobile stations terminate (or leave) their broadcast services.

Figure 5:
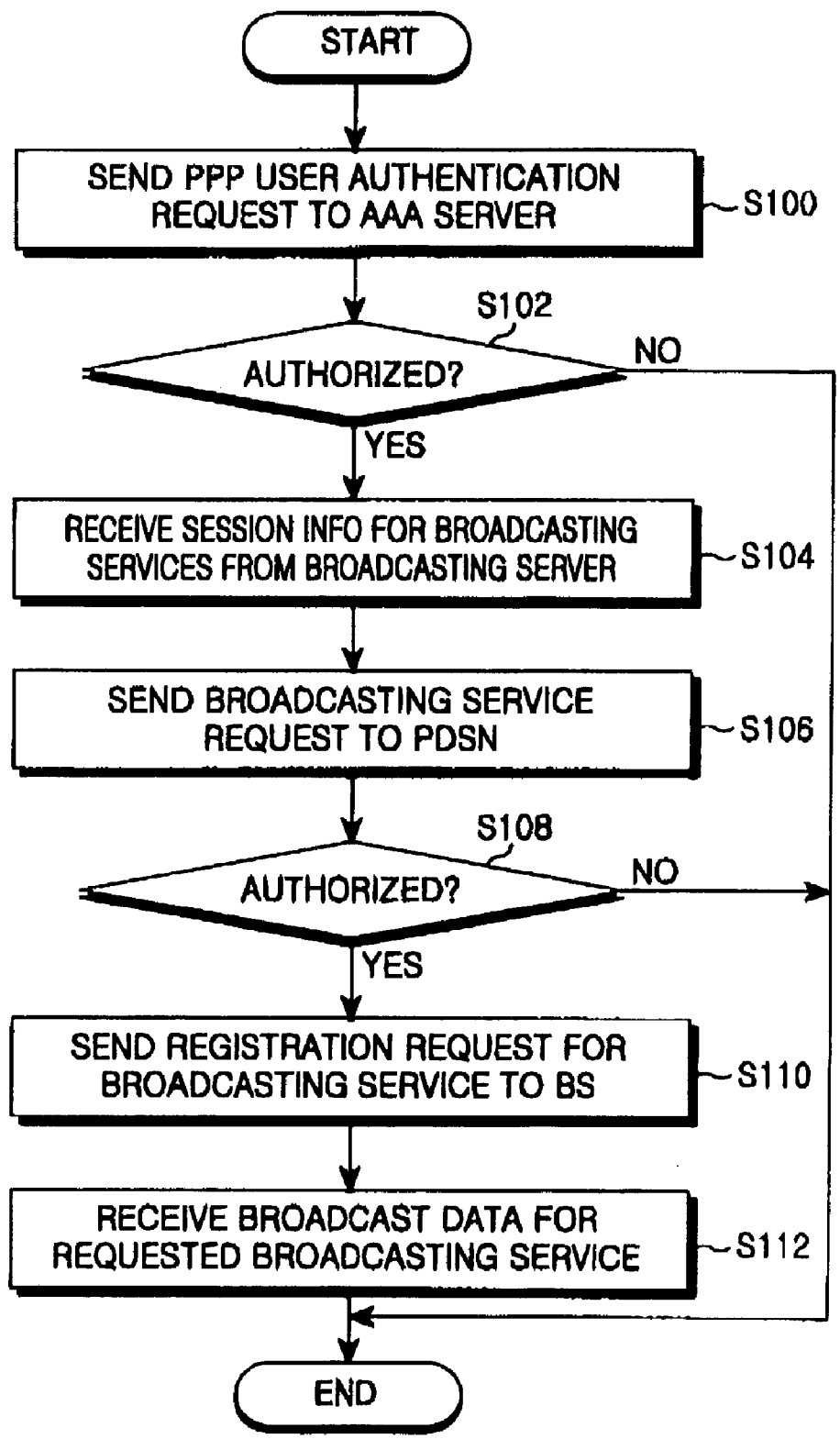
FIG. 5 is a flowchart illustrating an operation performed by a mobile station to initiate a broadcast service as illustrated in FIG. 4.

FIG. 5 is a flowchart illustrating an operation performed by a mobile station to initiate a broadcast service as shown in FIG. 4. Referring to FIG. 5, a mobile station desiring to receive a broadcast service sends a user authentication request to an authentication server through PPP connection in step S100, and receives service authorization information for the user in response to the user authentication request in step S102. If the user is not authorized in step S102, the flow ends. In step S104, if session information for broadcast services is received from a broadcast server, the mobile station requests, in step S106, the desired broadcast service by transmitting information related to the desired broadcast service, i.e., BCMCS_ID and multicast IP address, to a packet data serving node.

If a broadcast service authorization response is received in step S108 in response to the broadcast service request, the mobile station transmits in step S110 a registration request for the desired broadcast service corresponding to the BCMCS_ID and the multicast IP address to a base station in order to register the desired broadcast service. If the service is not authorized in step S108, the flow ends. The base station then transmits broadcast data for the broadcast service in response to the registration request. In step S112, the mobile station receives the broadcast data for the desired broadcast service.

Figure 6:
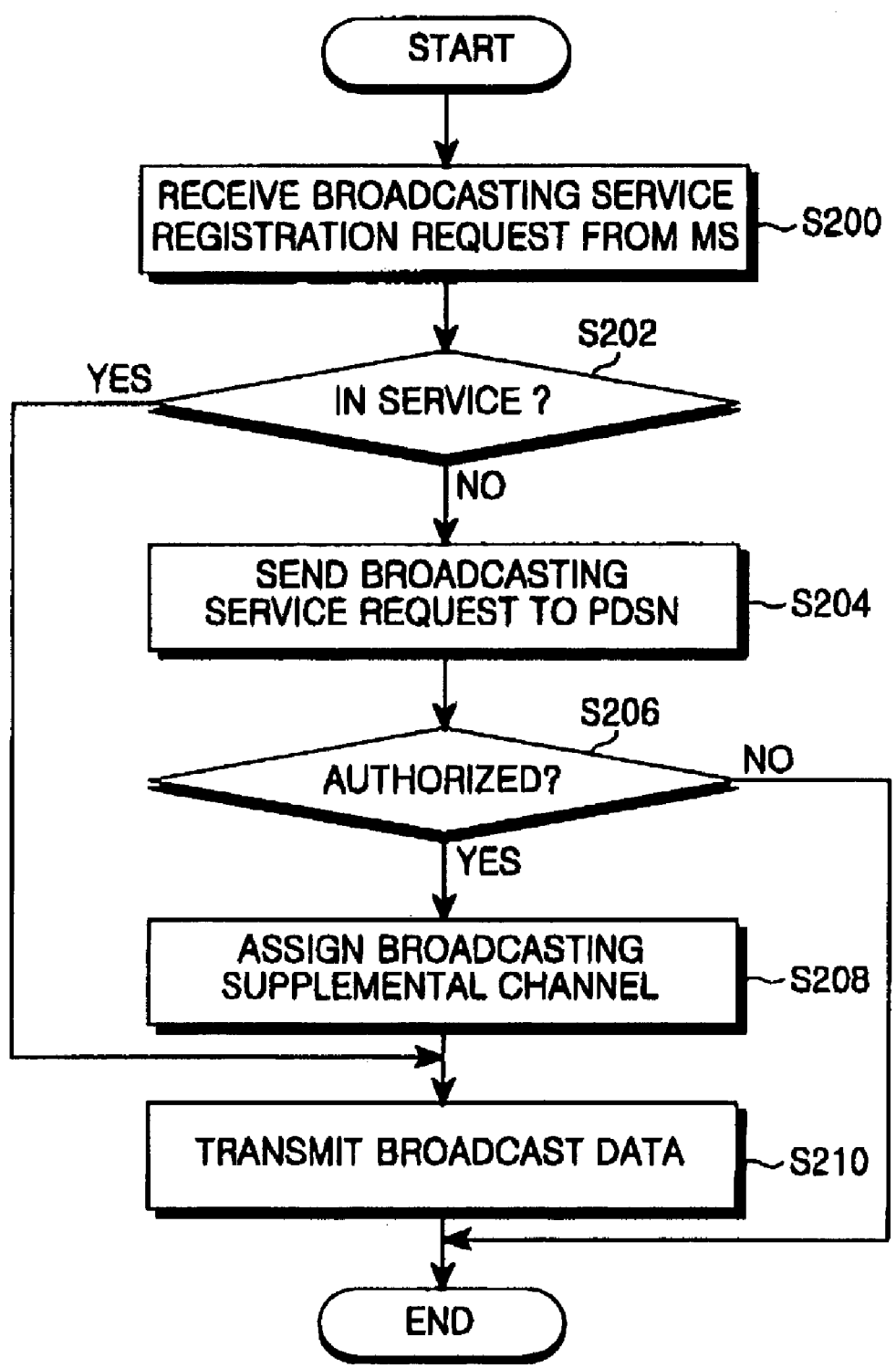
FIG. 6 is a flowchart illustrating an operation performed by a base station to initiate a broadcast service as illustrated in FIG. 4.

FIG. 6 is a flowchart illustrating an operation performed by a base station to initiate a broadcast service as shown in FIG. 4. Referring to FIG. 6, if a registration request for a broadcast service that a mobile station desires to receive is received in step S200, a base station determines in step, S202 whether the broadcast service is already being provided. If the broadcast service is currently in operation, the base station proceeds to step S210 where it continues to transmit broadcast data for the broadcast service. However, if the broadcast service is not being provided, the base station sends a broadcast service request to a packet data serving node in step S204. If it is determined in step S206 that the broadcast service was authorized, the base station assigns a wireless broadcast supplemental channel and a network resource for the broadcast service in step S208, and then transmits broadcast data for the broadcast service over the assigned broadcast supplemental channel in step S210.

Figure 7:
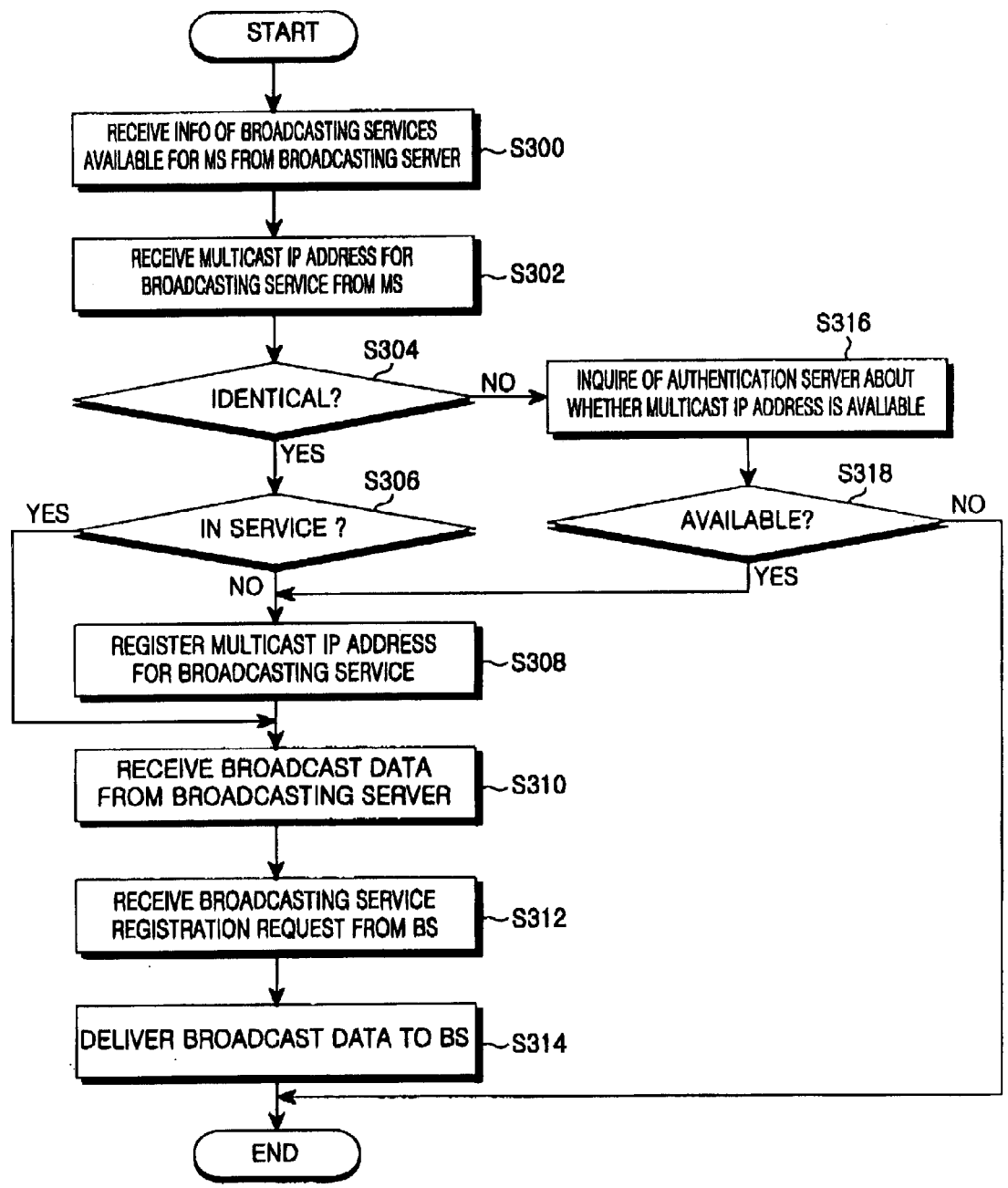
FIG. 7 is a flowchart illustrating an operation performed by a packet data serving node to initiate a broadcast service as illustrated in FIG. 4.

FIG. 7 is a flowchart illustrating an operation performed by a packet data serving node to initiate a broadcast service as shown in FIG. 4. Referring to FIG. 7, if information on broadcast services available for a mobile station is received from a broadcast server in step S300, and BCMCS_ID and a multicast IP address for a broadcast service desired by the mobile station is received in step S302, a packet data serving node determines in step S304 whether the multicast IP address is identical to a multicast IP address for the broadcast services available for the mobile station. Here, the multicast IP address for the broadcast services available for the mobile station is included in the information received from the broadcast server.

If the multicast IP addresses are not identical to each other, the packet data serving node inquires, in step S316, of an authentication server about whether the multicast IP address for the desired broadcast service is available. If it is determined in step S318 that the multicast IP address for the desired broadcast service is not available, the packet data serving node ends the operation, and otherwise, proceeds to step S308.

If the multicast IP addresses are identical to each other in step S304, the packet data serving node determines in step S306 whether the desired broadcast service corresponding to the multicast IP address is currently being provided. If the desired broadcast service corresponding to the multicast IP address is currently not in operation, the packet data serving node registers in step S308 the multicast IP address for the desired broadcast service in a multicast IP routing table. However, if the desired broadcast service corresponding to the multicast IP address is currently in operation, the packet data serving node proceeds to step S310. In step S310, the packet data serving node starts receiving broadcast data for the registered broadcast service from the broadcast server.

If a registration request for the broadcast service corresponding to the multicast IP address registered in the multicast IP routing table is received from a base station in step S312, the packet data serving node delivers the corresponding broadcast data received from the broadcast server to the base station in step S314.

Figure 8:
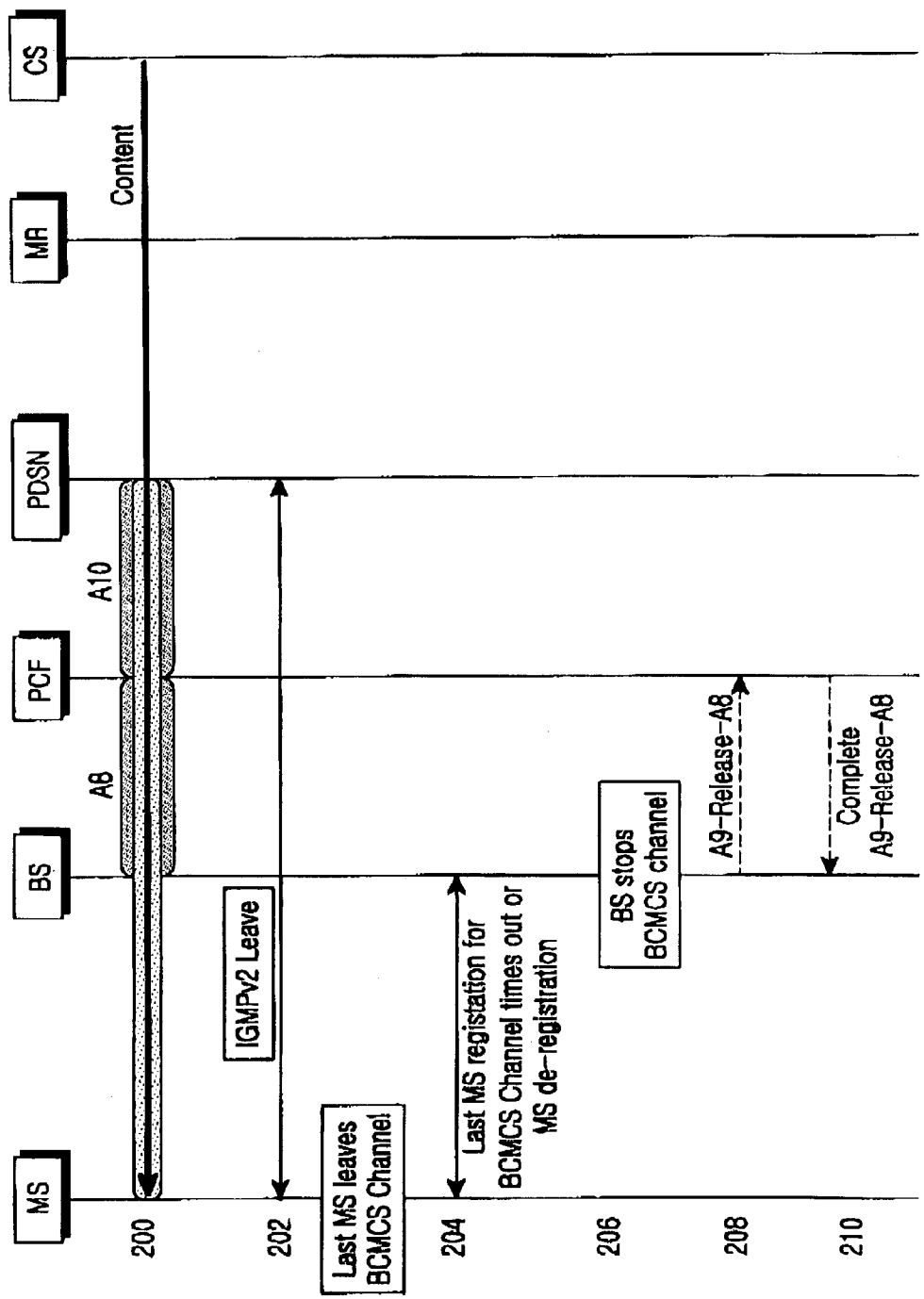
FIG. 8 is a message flow diagram illustrating a procedure for returning system resources by a mobile station after leaving (or terminating) a broadcast service according to an embodiment of the present invention.

FIG. 8 is a message flow diagram illustrating a procedure for returning resources by a mobile station after leaving (or terminating) a broadcast service according to an embodiment of the present invention. Referring to FIG. 8, in step 200, a plurality of mobile stations (MSs) registered as a broadcast service receiving group receives broadcast data for a broadcast service from a broadcast server (or a contents server (CS)). In step 202, one of the mobile stations sends a broadcast service leave request to a packet data serving node (PDSN) through a leave procedure based on IGMP. In step 204, the mobile station sends a BCMCS de-registration message to a base station (BS). The base station determines whether each of the mobile stations registered as the broadcast service receiving group has left its broadcast service, depending on whether the BCMCS deregistration message was received or whether a broadcast timer has expired.

If the mobile station that transmitted the BCMCS de-registration message is the last mobile station that was using a corresponding broadcast supplemental channel in its service area, the base station stops in step 206 the use of resources (i.e., broadcast supplemental channel and network resource), and then transmits in step 208 a release message (A9-Release-A8) to a packet control function unit (PCF) in order to return the resources. In this case, the packet control function unit does not send a response for the release message. This is because when a plurality of base stations are connected to one packet control function unit, there may exist other base stations, which are providing a corresponding broadcast service.

If all of the base stations connected to the packet control function unit determine that all mobile stations that were receiving the broadcast supplemental channel have left the broadcast service, the packet control function unit transmits in step 210 a release complete message (Complete A9-Release-A8) to all the base stations connected thereto. Then, the packet control function unit and the packet data serving node release all network resources related to the broadcast service.

Figure 9:
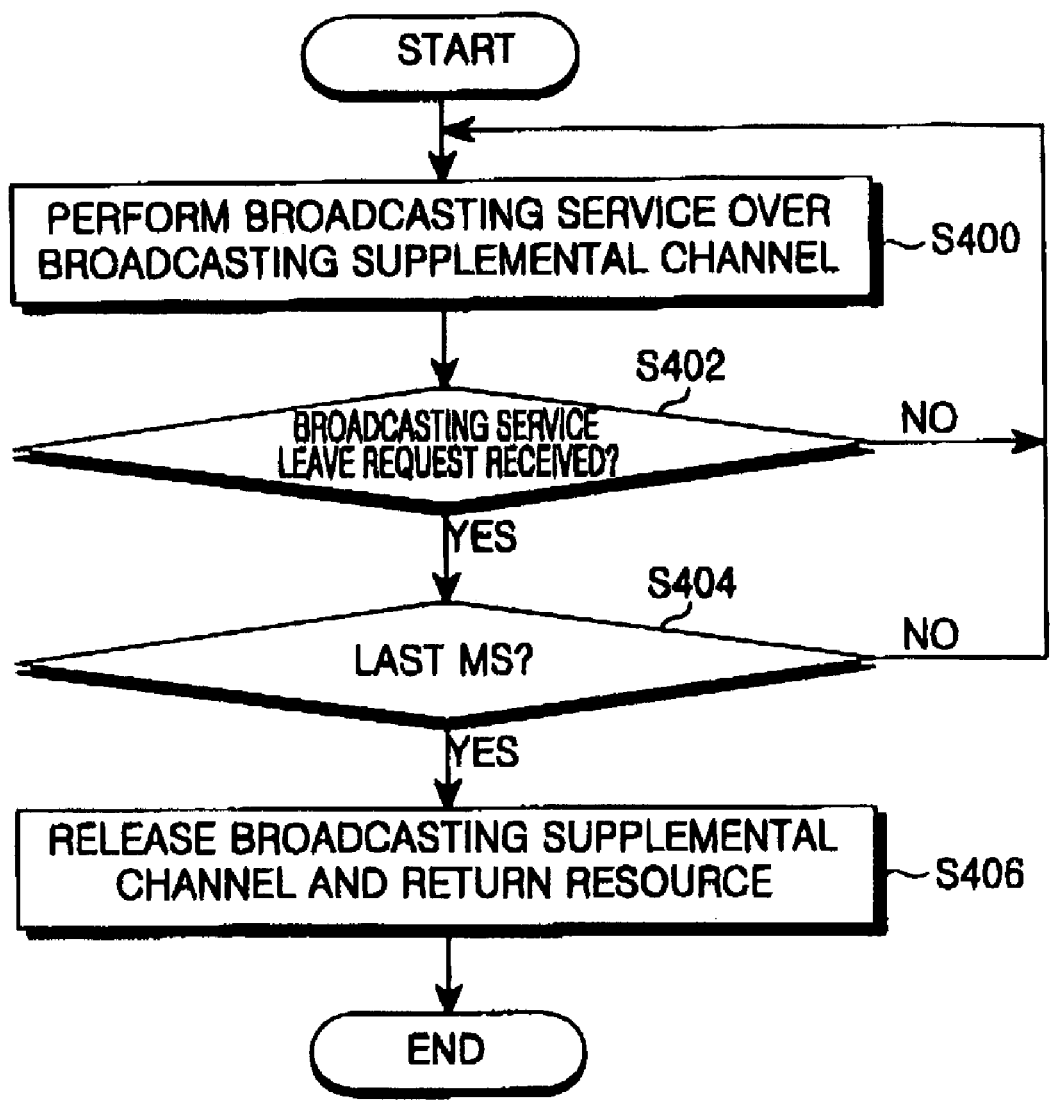
FIG. 9 is a flowchart illustrating an operation of leaving a broadcast service by a base station as shown in FIG. 8.

FIG. 9 is a flowchart illustrating an operation of leaving a broadcast service by a base station as illustrated in FIG. 8. Referring to FIG. 9, in step S400, broadcast data for a broadcast service desired by a mobile station is transmitted from a base station to the mobile station. If a broadcast service leave request is received in step S402, or a broadcast service of a particular mobile station is left as a broadcast timer expires, the base station determines in step S404 whether the particular mobile station is the last mobile station that uses the corresponding broadcast supplemental channel. If the particular mobile station is the last mobile station, the base station releases the broadcast channel and withdraws the network resource in step S406. Otherwise, if the particular mobile station is not the last mobile station, the base station maintains the broadcast supplemental channel.

Figure 10:
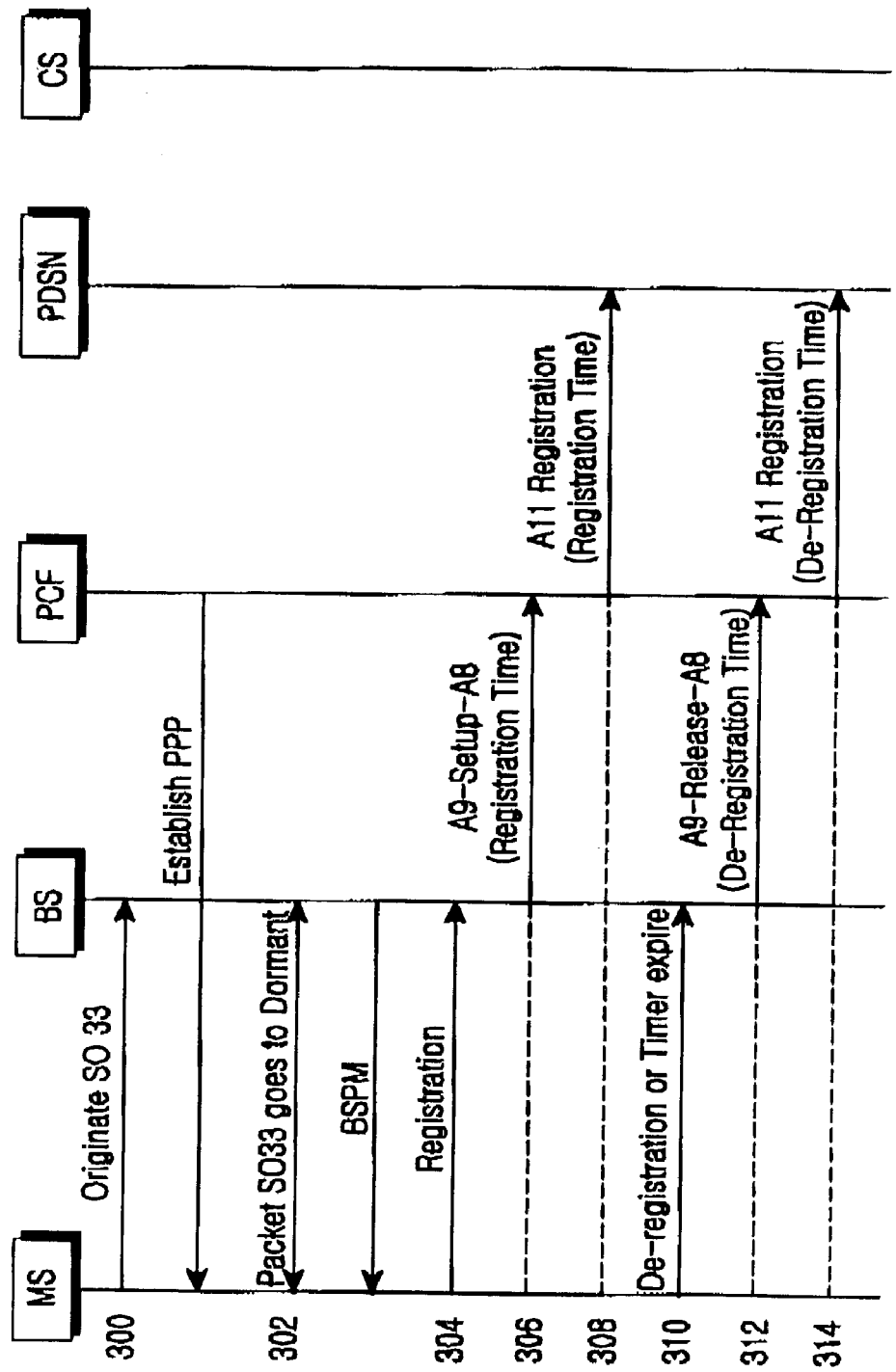
FIG. 10 is a message flow diagram illustrating a procedure for performing accounting on a broadcast service of a mobile station according to an embodiment of the present invention.

FIG. 10 is a message flow diagram illustrating a procedure for performing accounting on a broadcast service of a mobile station according to an embodiment of the present invention. Referring to FIG. 10, in step 300, a mobile station (MS) desiring to receive a broadcast service connects a call based on Service Option 33 (hereinafter referred to as "SO33") through a dedicated channel assigned between the mobile station and a base station (BS), establishes PPP connection with a packet data serving node (PDSN), and then receives information for the broadcast service from a broadcast server (or a contents server (CS)) through the PPP connection. Thereafter, if the broadcast service is registered, the dedicated channel is released and the SO33-based call transitions to a dormant state, in step 302.

In the dormant state, a broadcaster service parameter message (BSPM) is transmitted from the base station to the mobile station through an overhead message. The overhead message includes a physical channel parameter, a logical parameter and mapping information for a broadcast service.

In step 304, the mobile station registers the desired broadcast service in the base station through an access channel. In step 306, the base station transmits a call setup message (A9-Setup-A8) to a packet control function unit (PCF) in response to a broadcast service registration request from the mobile station. In this case, the call setup message includes information on a time when the mobile station registered the broadcast service, i.e., information on a service start time.

In step 308, the packet control function unit receives the call setup message, searches a packet data serving node that can provide the desired broadcast service, based on IMSI (International Mobile System Identifier) of the mobile station, and then transmits a registration message (All Registration) with service start time information to the packet data serving node. The packet data serving node then assigns system and network resources for the broadcast service in response to the registration message, and generates accounting information based on the IMSI and the service start time information.

If the mobile station transmits a de-registration message to the base station in step 310 or the broadcast service of the mobile station is left as a broadcast timer expires, the base station transmits in step 312 a release message (A9-Release-A8) including IMSI of the mobile station and service leave time information (i.e., information on a time when the mobile station deregistered the broadcast service) to the packet control function unit. In step 314, the packet control function unit searches corresponding connection information of the mobile station according to the IMSI in response to the release message, and transmits a registration message (A11 Registration) with service leave time information to the packet data serving node according to the searched connection information. In this case, the connection information means connection information based on an interface set during S033 setup in step 300, rather than an interface set for broadcasting.

Figure 11:
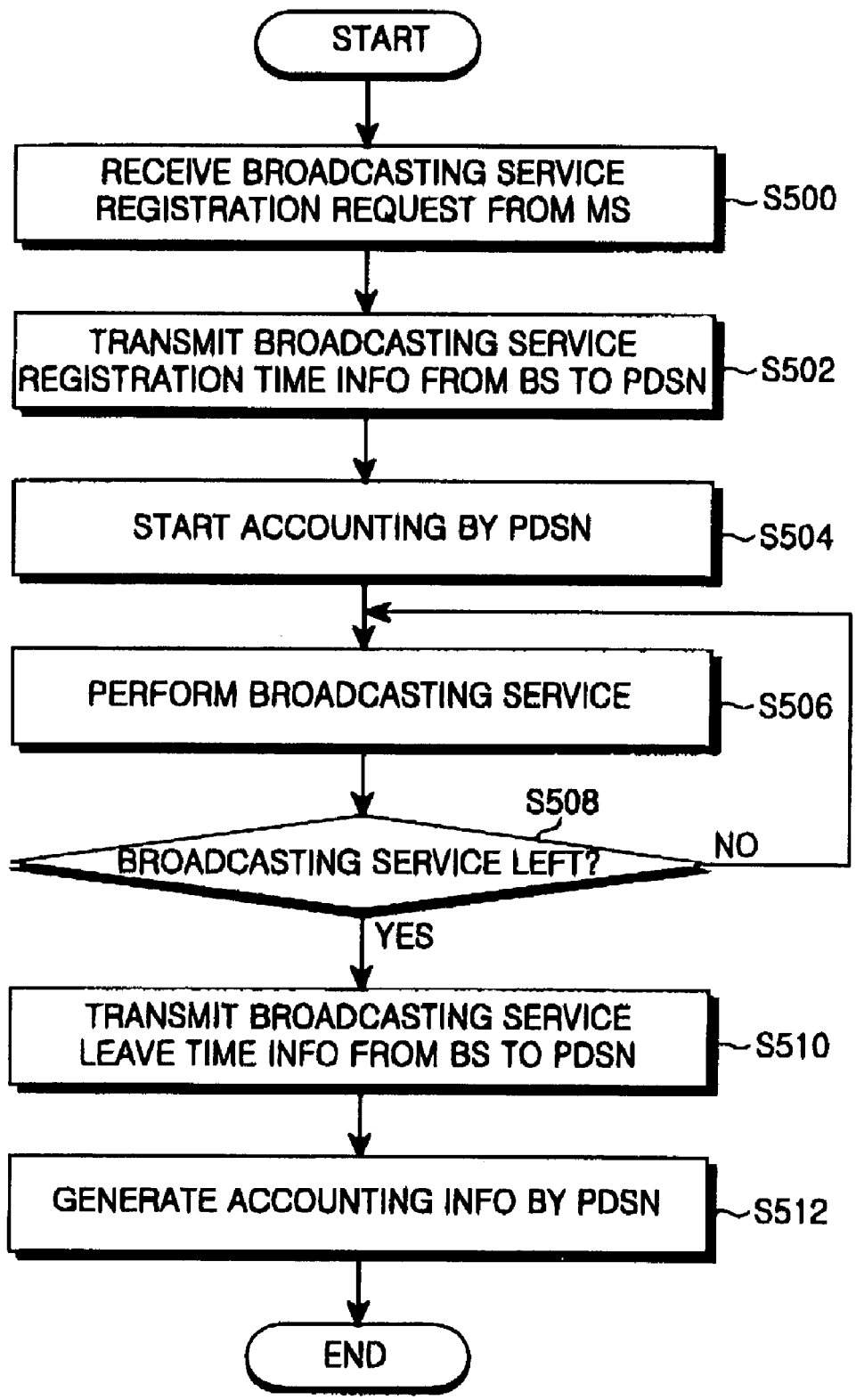
FIG. 11 is a flowchart illustrating an operation of performing accounting on a broadcast service by a base station and a packet data serving node as shown in FIG. 10.

FIG. 11 is a flowchart illustrating an operation of performing accounting on a broadcast service by a base station and a packet data serving node as shown in FIG. 10. Referring to FIG. 11, if a base station receives in step S500 a broadcast service registration request from a mobile station, the base station generates in step S502 broadcast service registration time information (i.e., service start time information) and transmits the generated broadcast service registration time information to a packet data serving node. In step S504, the packet data serving node starts generating accounting information, using the broadcast service registration time information. In step S506, the broadcast service is performed. If the broadcast service is left in step S508, the base station generates information on a time when the broadcast service is left in step S510, and transmits the generated broadcast service leave time information to the packet data serving node. In step S512, the packet data serving node generates accounting information related to the broadcast service, using the broadcast service registration time information and the broadcast service leave time information.

Figure 12:
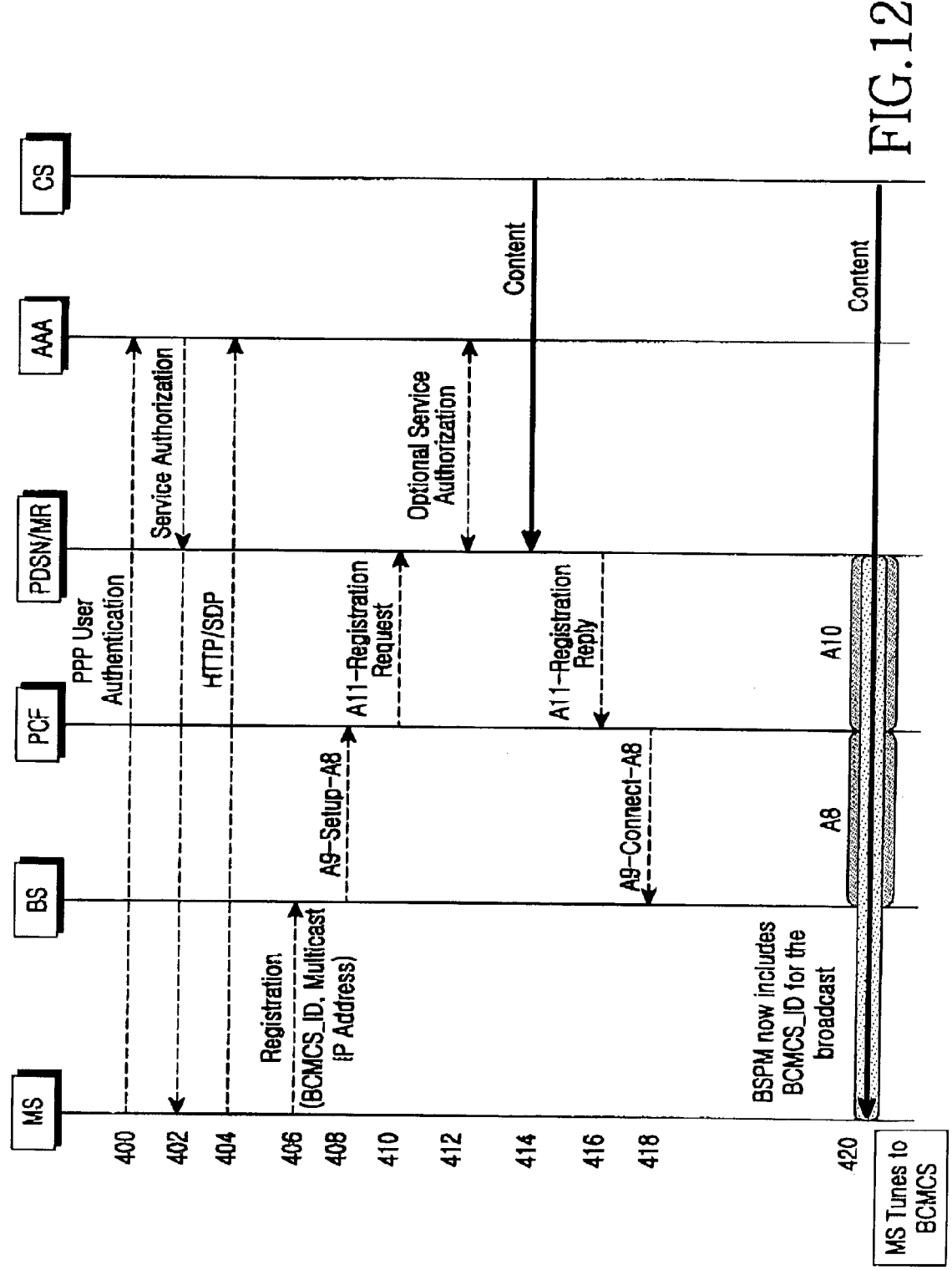
FIG. 12 is a message flow diagram illustrating a procedure for assigning broadcast service resources using a registration message according to another embodiment of the present invention.

FIG. 12 is a message flow diagram illustrating a procedure for assigning broadcast service resources using a registration message according to another embodiment of the present invention. In FIG. 12 compared with FIG. 4, a mobile station registers a broadcast service using a registration message instead of using an IGMP message.

Referring to FIG. 12, in step 400, a mobile station (MS) sends a user authentication request to an authentication server (AAA) through PPP connection in order to request a broadcast service. If the user authentication is completed, the authentication server delivers in step 402 to a corresponding packet data serving node (PDSN) information on broadcast services that the user can receive, the information being stored in a database of the authentication server.

The delivered information includes broadcast multicast service identifiers (BCMCS_IDs) for identifying broadcast services, multicast IP addresses and source IP addresses for identifying sources that provide a broadcast service, or includes a table identifier by which the above parameters can be searched from a database of the packet data serving node (PDSN).

In step 404, the mobile station sets up a call based on Service Option 33 (SO33) designating a packet data service through a dedicated channel, and receives session information related to broadcast services from a broadcast server (or a contents server (CS)), using HTTP or SDP. In step 406, the mobile station transmits a registration message with BCMCS_ID and multicast IP address corresponding to a desired broadcast service, to a base station (BS) over an access channel.

In step 408, the base station sends a packet control function unit (PCF) a call setup message (A9-Setup-A8) carrying the BCMCS_ID and the multicast IP address. In step 410, the packet control function unit sends the packet data serving node a registration request message (A11-Registration Request) carrying the BCMCS_ID and the multicast IP address in response to the call setup message. The packet data serving node then analyzes the requested multicast IP address in response to the registration request message.

In the case where the packet data serving node is already servicing the corresponding broadcasting contents while the multicast IP address requested by the mobile station is identical to the multicast IP address authorized in step 402 by the authentication server, the packet data serving node does not require new management such as system and network resource assignment for providing a broadcast service. On the other hand, in the case where the requested multicast IP address is identical to the authorized multicast IP address but the packet data serving node is not performing the service, the packet data serving node registers the requested multicast IP address in a multicast IP routing table.

If the requested multicast IP address is not identical to the authorized multicast IP address, the packet data serving node inquires of the authentication server about whether the requested multicast IP address is available, through an optional service authentication procedure, in step 412. If it is determined that the requested multicast IP address is available, the packet data serving node registers the requested multicast IP address in the multicast IP routing table, and builds a multicast IP spanning tree by communication a routing message indicating the particulars registered in the routing table with neighboring routers.

After the requested multicast IP address is analyzed, the broadcast server starts transmitting broadcast data for the corresponding broadcast service to the packet data serving node, in step 414. Subsequently, in step 416, the packet data serving node transmits to the packet control function unit a registration response message (A11-Registration Reply) indicating that a broadcast service corresponding to the BCMCS_ID and the multicast IP address was authorized, in response to the registration request message. In step 418, the packet control function, unit determines from the registration response message that the broadcast service was authorized, and then delivers a connection message (A9-Connect-A8) for notifying this situation, to the base station. In step 420, the mobile station receives the broadcast data by tuning to the forward broadcast supplemental channel corresponding to the BCMCS_ID.

The disclosed embodiments of the present invention control transmission of a broadcast service data stream according to base station areas through registration of a broadcast service of a mobile station, thereby minimizing a waste of wired/wireless resources. Therefore, embodiments of the present invention can efficiently use base station resources by controlling broadcast service times of base stations, and efficiently use resources of the base stations and a network when a plurality of mobile stations simultaneously request broadcast services.

While the invention has been shown and described herein with reference to a certain preferred embodiment thereof, it will be understood by those skilled in the art that various changes in form and details may be made therein without departing from the spirit and scope of the invention as defined by the appended claims.

What is claimed is:

1. A method for receiving a broadcast service by a mobile station in a wireless broadcast service system comprising said mobile station existing in a service area, a base station capable of connecting a wireless channel to said mobile station, a packet data serving node for connecting said base station to a packet communication network, a broadcast server connected to said packet communication network, and an authentication server connected to said packet communication network, the method comprising:
   (a) performing user authentication by setting up a connection with the authentication server, and receiving, if the user authentication is passed, information on available broadcast services from the broadcast server;
   (b) registering a desired broadcast service in the packet data serving node based on said received information so that said packet data serving node assigns a network resource for the desired broadcast service, wherein said step of registering in the packet data serving node further comprises transmitting a multicast IP address for the desired broadcast service to the packet data serving node and controlling the packet data serving node to compare the received multicast IP address with an authorized multicast IP address received from the authorization server for registration control and inquiry generation;
   (c) if the received multicast IP address is identical to an authorized multicast IP address and the desired broadcast service is authorized by the packet data serving node, registering said desired broadcast service in said base station so that said base station assigns a wireless broadcast channel and a network resource for the desired broadcast service; and
   (d) receiving broadcast data for said desired broadcast service over said broadcast channel assigned by said base station.

2. The method of claim 1, wherein said information on broadcast services includes broadcast service identifiers, and multicast Internet protocol (IP) addresses.

3. The method of claim 1, wherein said step of registering in said base station further comprises transmitting the multicast IP address and a broadcast service identifier for the desired broadcast service to the base station.

4. The method of claim 1, wherein the broadcast server is a broadcast server designated by a common carrier or a mobile station registered in the packet data serving node.

5. The method of claim 1, further comprising sending, if a broadcast service leave request is received from a user, a broadcast service leave request to said base station and the packet data serving node so that said packet data serving node withdraws the network resource and said base station withdraws the network resource and releases said broadcast channel.

6. A method for providing a broadcast service to a mobile station by a base station in a wireless broadcast service system comprising the mobile station existing in a service area, the base station capable of connecting a wireless channel to said mobile station, a packet data serving node for connecting the base station to a packet communication network, a broadcast server connected to the packet communication network, and an authentication server connected to the packet communication network, the method comprising:

(a) upon receiving a broadcast service registration request from the mobile station, determining whether the requested broadcast service is already being provided, wherein said determining step further comprises receiving a multicast Internet protocol (IP) address and a broadcast service identifier for the requested broadcast service from the mobile station, determining whether a broadcast channel for the requested broadcast service has already been assigned based on the multicast IP address and the broadcast service identifier, and controlling the packet data serving node to compare the received multicast IP address with an authorized multicast IP address received from the broadcast server for registration control and inquiry generation;

(b) if the requested broadcast service is not being provided, registering the requested broadcast service in the packet data serving node so that the packet data serving node assigns a network resource for the requested broadcast service; and (c) if the requested broadcast service is authorized by the packet data serving node, assigning a wireless broadcast channel for the broadcast service and transmitting broadcast data for the requested broadcast service received from the packet data serving node to the mobile station over the assigned broadcast channel.

7. The method of claim 6, wherein said registering step further comprises transmitting a multicast IP address and a broadcast service identifier for the broadcast service to the packet data serving node.

8. The method of claim 6, wherein the broadcast server is a broadcast server designated by a common carrier or a mobile station registered in the packet data serving node.

9. The method of claim 6, further comprising determining, if the broadcast service of the mobile station is left, whether the mobile station is a unique mobile station that uses the broadcast service within a service area of the base station, and releasing, if the mobile station is the unique mobile station, the assigned broadcast channel and then withdrawing the network resource assigned for the broadcast service.

10. The method of claim 6, wherein said registering step further comprises transmitting information on a time when the mobile station requested registration of the broadcast service, to the packet data serving node so that the packet data serving node can start accounting on the broadcast service.

11. The method of claim 10, further comprising transmitting, if the broadcast service of the mobile station is left, information on a time when the broadcast service is left, to the packet data serving node so that the packet data serving node can complete accounting on the broadcast service.

12. A method for providing a broadcast service to a mobile station by a packet data serving node in a wireless broadcast service system comprising the mobile station existing in a service area, a base station capable of connecting a wireless channel to said mobile station, the packet data serving node for connecting the base station to a packet communication network, a broadcast server connected to the packet communication network, and an authentication server connected to the packet data communication network, the method comprising:

(a) receiving information on broadcast services available for the mobile station from the authentication server;

(b) upon receiving a registration request for a broadcast service desired by the mobile station, assigning a network resource for the requested broadcast service based on the received information on the available broadcast services; and (c) upon receiving a registration request for the requested broadcast service from the base station, transmitting broadcast data for the requested broadcast service received from the broadcast server to the mobile station through the base station, using the assigned network resource, wherein the step of assigning a network resource comprises the steps of, receiving a multicast IP address for the requested broadcast service from the mobile station and determining whether the received multicast IP address is identical to a multicast IP address previously received from the broadcast server;

if the multicast IP addresses are identical to each other and the requested broadcast service is not being provided, registering the multicast IP address for the requested broadcast service in a multicast IP routing table in order to receive broadcast data for the requested broadcast service from the broadcast server; and if the multicast IP addresses are not identical to each other, inquiring of the authentication server about whether the multicast IP address for the requested broadcast service is available, and if the multicast IP address for the requested broadcast service is available, registering the multicast IP address for the requested broadcast service in the multicast IP routing table in order to receive broadcast data for the requested broadcast service from the broadcast server.

13. The method of claim 12, wherein said information on the broadcast services includes broadcast service identifiers, multicast Internet protocol (IP) addresses and source IP addresses, or includes a table identifier by which the broadcast service identifiers, the multicast Internet protocol (IP) addresses and the source IP addresses can be searched from an internal database.

14. The method of claim 12, wherein said transmitting step further comprises:

receiving a multicast IP address and a broadcast service identifier for the requested broadcast service from the base station;

determining whether the requested broadcast service is available, based on the multicast IP address and the broadcast service identifier; and transmitting broadcast data received from the broadcast server to the mobile station via the base station, if the requested broadcast service is available.

15. The method of claim 12, wherein the broadcast server is a broadcast server designated by a common carrier or a mobile station registered in the packet data serving node.

16. The method of claim 12, further comprising starting accounting on the broadcast service of the mobile station upon receiving a registration request for the broadcast service of the mobile station.

17. The method of claim 16, further comprising generating, if the broadcast service of the mobile station is left, accounting information for the broadcast service of the mobile station and transmitting the generated accounting information to the authentication server.

* * * * *